(12) United States Patent
Hellmers et al.

(10) Patent No.: US 12,150,584 B2
(45) Date of Patent: Nov. 26, 2024

(54) INDUCTION KETTLE

(71) Applicant: BREVILLE PTY LIMITED, Alexandria (AU)

(72) Inventors: Duncan Bruce Hellmers, Alexandria (AU); Stephen John McClean, Alexandria (AU); Johnson Thie, Alexandria (AU); Richard Hoare, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 628 days.

(21) Appl. No.: 17/435,858

(22) PCT Filed: Mar. 9, 2020

(86) PCT No.: PCT/AU2020/050221
§ 371 (c)(1),
(2) Date: Sep. 2, 2021

(87) PCT Pub. No.: WO2020/176952
PCT Pub. Date: Sep. 10, 2020

(65) Prior Publication Data
US 2022/0151425 A1 May 19, 2022

(30) Foreign Application Priority Data
Mar. 7, 2019 (AU) .............................. 2019900755

(51) Int. Cl.
*A47J 27/21* (2006.01)
*H05B 6/06* (2006.01)
(Continued)

(52) U.S. Cl.
CPC ..... *A47J 27/2105* (2013.01); *A47J 27/21108* (2013.01); *A47J 27/21175* (2013.01);
(Continued)

(58) Field of Classification Search
CPC .. A47J 27/21; A47J 27/2105; A47J 27/21016; A47J 27/21041;
(Continued)

(56) References Cited

U.S. PATENT DOCUMENTS

2022/0007873 A1* 1/2022 Collinson ......... A47J 27/21016

FOREIGN PATENT DOCUMENTS

| CN | 200945093 Y | 9/2007 |
|---|---|---|
| CN | 202051519 U | 11/2011 |

(Continued)

OTHER PUBLICATIONS

Supplementary European Search Report for Application No. 20766896.3 dated Oct. 28, 2022.
(Continued)

*Primary Examiner* — Hung D Nguyen
(74) *Attorney, Agent, or Firm* — MOSER TABOADA

(57) ABSTRACT

An appliance including: a vessel to receive a liquid, the vessel having a longitudinal axis, a bottom wall, and a side wall at least partly enclosing a chamber within which the liquid is heated, the chamber having an upper region axially spaced from the bottom wall, and a lower region located between the bottom wall and the upper region; a heating element within the chamber; a heater base including at least a portion of an induction coil; connections to deliver an alternating current to the induction coil to deliver a magnetic field to the lower region; the element being movable relative to the coil between an operative position at which the element is located within the lower region to be energised by the magnetic field to cause heating of the element, and an inoperative position at which the element is located in the upper region to not energize the element.

12 Claims, 8 Drawing Sheets

(51) Int. Cl.
    *H05B 6/10*      (2006.01)
    *H05B 6/12*      (2006.01)
(52) U.S. Cl.
    CPC ............... *H05B 6/06* (2013.01); *H05B 6/108* (2013.01); *H05B 6/12* (2013.01)
(58) Field of Classification Search
    CPC ............ A47J 27/21058; A47J 27/21075; A47J 27/211; A47J 27/21108; A47J 27/21133; A47J 27/21175; A47J 27/21191; H05B 6/06; H05B 6/108; H05B 6/12; H05B 6/1209
    See application file for complete search history.

(56)            References Cited

FOREIGN PATENT DOCUMENTS

| CN | 102072506 B | 10/2012 | | |
|---|---|---|---|---|
| DE | 3721200 A1 | 1/1989 | | |
| WO | WO-2007071568 A1 | 6/2007 | | |
| WO | WO 2014/102336 A1 | 7/2014 | | |
| WO | WO-2016074743 A1 | 5/2016 | | |
| WO | WO-2020064262 A1 | * | 4/2020 | ............ A47J 27/002 |
| WO | WO 2020/104793 A1 | 5/2020 | | |

OTHER PUBLICATIONS

International Search Report for Application No. PCT/AU2020/050221 dated May 15, 2020.

* cited by examiner

INDUCTION KETTLE

FIELD

The present invention relates to appliances to heat liquids, and more particularly, but not exclusively to induction kettles.

BACKGROUND

Kettles are well-known devices to rapidly boil water for, for example, making tea, cooking, or the like. Power from the main power supply is delivered to an electrical heating element typically located in the base of the kettle.

Induction kettles can be heated by use of induction coils to heat a liquid inside the kettle. An induction heating circuit produces heat on "loads" (such as a ferromagnetic base of the kettle) using the principle of magnetic induction.

Disadvantageously, switching off the induction kettle may require manual operation or complex circuitry.

OBJECT

It is an object of the present invention to substantially overcome, or at least ameliorate, one or more of the above disadvantages.

SUMMARY OF INVENTION

There is disclosed herein an appliance to heat a liquid, the appliance including:

a vessel to receive the liquid to be heated, the vessel having a generally central upright longitudinal axis, a bottom wall, and a side wall extending upwardly from the bottom wall, with the bottom wall and side wall at least partly enclosing a chamber within which the liquid is heated, with the chamber having an upper region axially spaced from the bottom wall, and a lower region located between the bottom wall and the upper region;

a heating element located within the chamber for relative movement therewithin, with the element at least partly formed of ferromagnetic material;

a heater base to be positioned relative to the bottom wall of the vessel, the heater base including at least a portion of an induction coil;

connections to deliver an alternating current to the induction coil so as to deliver a magnetic field to the lower region; and wherein the element is movable relative to the coil between an operative position at which the element is located within the lower region so as to be energised by the magnetic field to cause heating of the element so that heat generated by the element can be delivered to the liquid via conduction, and an inoperative position at which the element is located in the upper region so as to no longer place an operative load on the induction coil.

Preferably, the appliance includes a cover attached to the vessel so as to enclose, with the bottom wall and the side wall, the chamber, with the cover including:

an opening extending through the cover and generally centrally located on the axis; and a stopper at least partly sealingly located within the opening for movement relative thereto along the axis between a retracted position and an extended position at which the stopper is spaced upwardly along the axis from the retracted position, wherein the element is connected to the stopper so as to move therewith, with the retracted position corresponding to the operative position, and with the extended position corresponding to the inoperative position, and wherein the stopper is urged to move from the retracted position to the extended position when the chamber is subjected to a positive pressure relative to outside the chamber so as to move the element from the operative position to the inoperative position.

Preferably, the appliance includes a shaft generally aligned with the axis, with one end of the shaft attached to the element, and with the other end of the shaft attached to the stopper.

Preferably, the shaft has a predetermined length so as to locate the element in the lower region when the element is in the operative position and so as to locate the element in the upper region when the element is in the inoperative position.

Preferably, the element is in the form of a plate centrally located on the axis.

Preferably, the plate includes at least one bimetallic member located on an underside of the plate, with the member possessing at least two positions of stability, with each of the positions responsive to a threshold temperature.

Preferably, when the member is at a temperature below the threshold temperature, the member is in one of the stable positions in which the member is generally coplanar with the underside of the plate, and when the member is at a temperature above the threshold temperature, the member is configured to actuate to the second position of stability in which at least a portion of the member engages the bottom wall to move the plate into the upper region.

Preferably, the plate is perforated.

There is also disclosed a vessel to receive liquid to be heated by a heater base, the heater base having an induction coil and connections to deliver an alternating current to the induction coil so as to deliver a magnetic field to the vessel, the vessel having a generally central upright longitudinal axis, a bottom wall, and a side wall extending upwardly from the bottom wall, with the bottom wall and side wall at least partly enclosing a chamber within which the liquid is heated, with the chamber having an upper region axially spaced from the bottom wall, and a lower region located between the bottom wall and the upper region; and a heating element located within the chamber for relative movement therewithin, with the element at least partly formed of ferromagnetic material, wherein the element is movable relative to the bottom wall between an operative position, at which the element is located within the lower region so as to be energised by the magnetic field to cause heating of the element so that heat generated by the element can be delivered to the liquid via conduction, and an inoperative position, at which the element is located in the upper region, so as to no longer place an operative load on the induction coil.

Preferably, the vessel further includes a cover so as to enclose, with the bottom wall and the side wall, the chamber, with the cover including:

an opening extending through the cover and generally centrally located on the axis; and a stopper at least partly sealingly located within the opening for movement relative thereto along the axis between a retracted position and an extended position at which the stopper is spaced upwardly along the axis from the retracted position, wherein the element is connected to the stopper so as to move therewith, with the retracted position corresponding to the operative position, and with the extended position corresponding to the inoperative position, and wherein the stopper is urged to move from the retracted position to the extended position when the chamber is subjected to a positive pressure relative to outside the chamber so as to move the element from the operative position to the inoperative position.

Preferably, the vessel further includes a shaft generally aligned with the axis, with one end of the shaft attached to the element, and with the other end of the shaft attached to the stopper.

Preferably, the shaft has a predetermined length so as to locate the element in the lower region when the element is in the operative position and so as to locate the element in the upper region when the element is in the inoperative position.

Preferably, the element is in the form of a plate centrally located on the axis.

Preferably, the plate includes at least one bimetallic member located on an underside of the plate, with the member possessing at least two positions of stability, with each of the positions responsive to a threshold temperature.

Preferably, when the member is at a temperature below the threshold temperature, the member is in one of the stable positions in which the member is generally coplanar with the underside of the plate, and wherein, when the member is at a temperature above the threshold temperature, the member is configured to actuate to the second position of stability in which at least a portion of the member engages the bottom wall to move the plate into the upper region.

Preferably, the plate is perforated.

BRIEF DESCRIPTION OF DRAWINGS

Preferred forms of the present invention will now be described by way of example with reference to the accompanying drawings wherein.

DESCRIPTION OF EMBODIMENTS

Figure 1:
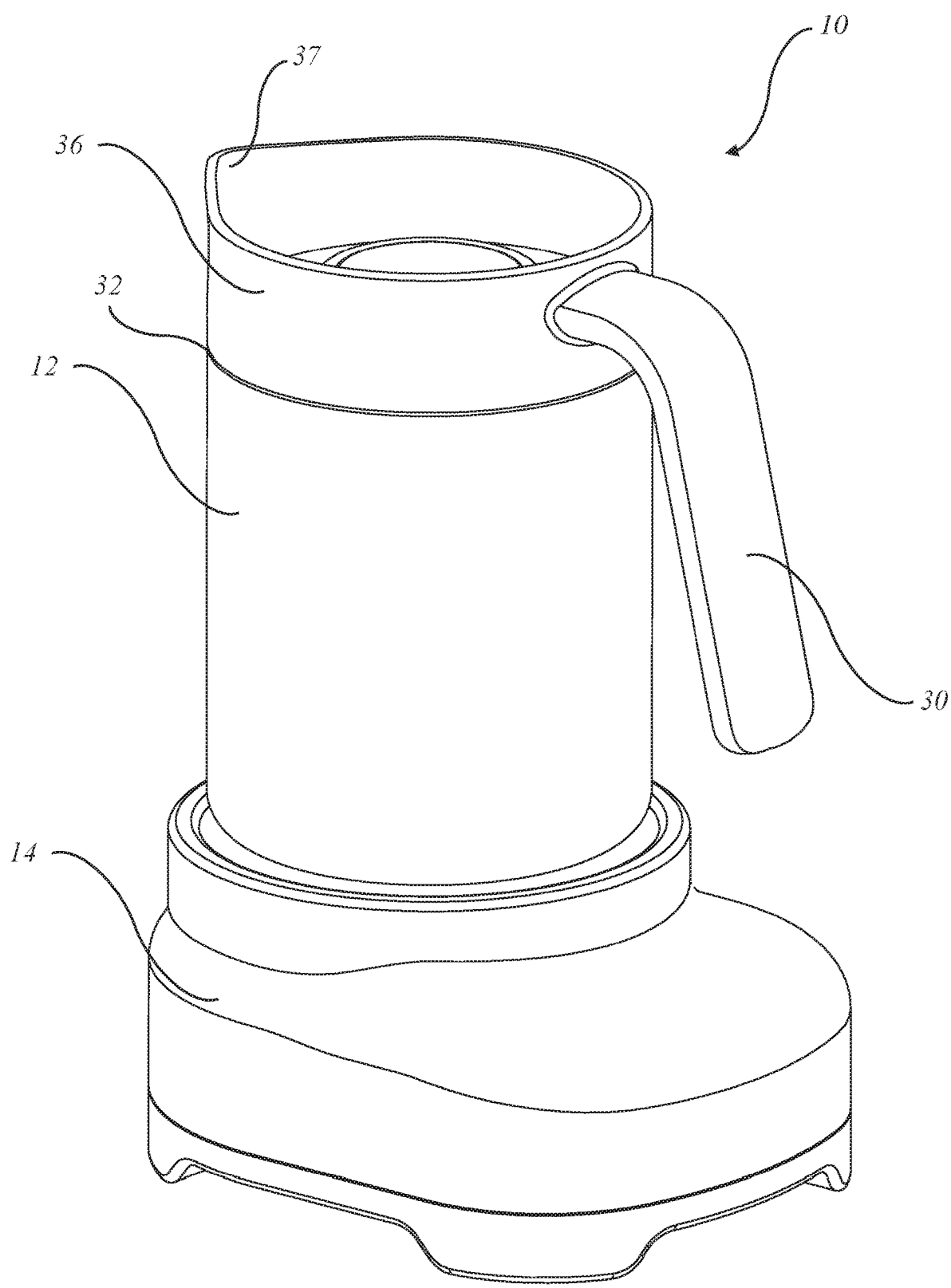
FIG. 1 is a schematic isometric view of an appliance according to an embodiment.

In the accompanying drawings there is schematically depicted an appliance to heat water, preferably the appliance is a kettle 10. The kettle 10 includes a vessel or jug 12 and a heater base 14 upon which the jug 12 rests. The base 14 delivers power to the plate 50, as discussed below. The jug 12 is preferably made from glass to be dishwasher friendly as an advantage of the preferred embodiment, which may make user experience relatively easier.

As shown in FIGS. 2 to 4 and 7, the base 14 houses a power supply 16 that is electrically coupled to an induction coil 18 also housed within the base 14. The induction coil 18 is magnetically coupled to the plate 50 when the plate 50 is resting on the base 14. In particular, the power supply 16 is configured to deliver an alternating current to the induction coil 18, so that the induction coil 18 is operable to deliver a magnetic field to the plate 50 for heating water contained in the jug 12.

The power supply 16 includes a micro-processor (not shown) and a power inlet (not shown). Cooperating with the micro-processor is a user interface (not shown) that is operated to control the micro-processor. Signals from the user interface are delivered to the micro-processor for the purposes of control.

A heat sink 20 that has a surface 21 is attached to electronics that are located on the bottom of the enclosure. The heat sink 20 cools the electronics by absorbing the heat. There is a gap between the heat sink 20 and the induction coil 18 to ensure that no short circuit will be caused.

The jug 12 includes a hollow body 22 providing a generally central upright longitudinal axis 24. The body 22 includes a bottom wall 26 from which there upwardly extends a side wall 28. The hollow body 22 also includes a handle 30 attached to the side wall 28. The side wall 28 provides a rim 32. The rim 32 surrounds an upper opening 34 that is closed by a cover or lid 36. The lid 36 provides a pouring lip 37 and an opening in the form of a cylindrical channel 38 extending through the lid 36. The channel 38 is centrally located on the axis 24. The body 22 may be formed of glass or other suitable material.

The bottom wall 26, side wall 28 and lid 36 enclose a chamber 40 that is to receive the water to be heated. The chamber 40 has an upper region 42 axially spaced from the bottom wall 26, and a lower region 44 located between the bottom wall 26 and the upper region 42. The induction coil 18 is configured so as to deliver the magnetic field to the lower region 44. It will be appreciated that a longitudinal extent of the lower region 44 may be varied based on the extent of the magnetic field.

To heat the water in chamber 40, the jug 12 is provided with a heater assembly 46. The assembly 46 includes a shaft 48 generally aligned with the axis 24. A heating element in the form of a circular plate 50 is attached at one end 51 of the shaft 48 proximal to the bottom wall 26 and centrally located on the axis 24. A purge cap or stopper 54 is attached at the other end 52 of the shaft 48. The stopper 54 sealingly locates within the channel 38 for movement relative thereto along the axis 24 between a retracted position and an extended position at which the stopper 54 is spaced upwardly along the axis 24 from the retracted position. One or more O-rings 56 may be secured to an outer circumference of the stopper 54 to provide adequate clearance between the stopper 54 and the channel 38 so as to facilitate axial movement of the stopper 54 relative to the channel 38 when the stopper 54 is moved in the axial direction. The O-rings 56 also provide a fluid tight seal to maintain any increase in pressure inside the chamber 40 as the water is heated. A height dimension of the channel 38 is preferably equal to a height dimension of the stopper 54, but it will be appreciated that both the height dimensions of the channel 38 and stopper 54 may be varied.

The plate 50 is formed of ferromagnetic material so as to be energized by the magnetic field of the induction coil 18, that is; so that a current can be induced in the plate 50, to cause heating of the plate 50 so that heat generated by the plate 50 can be delivered to the water via conduction. The plate 50 is able to move with the stopper 54 by virtue of the shaft 48.

Figure 2:
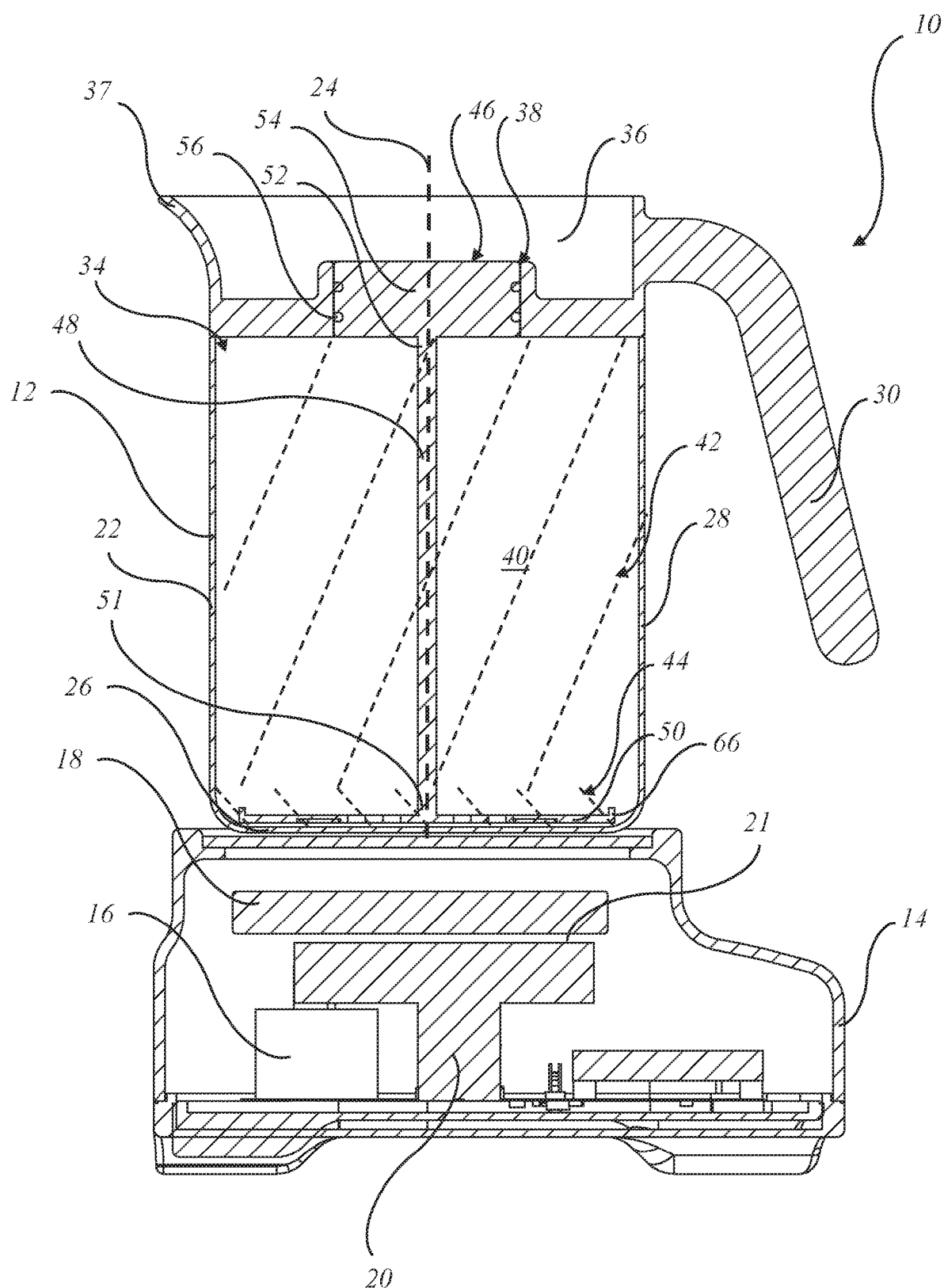
FIG. 2 is a schematic cross-sectional view of the appliance of FIG. 1, shown with a plate of the appliance located in a lower region of a chamber of the appliance.
Figure 3:
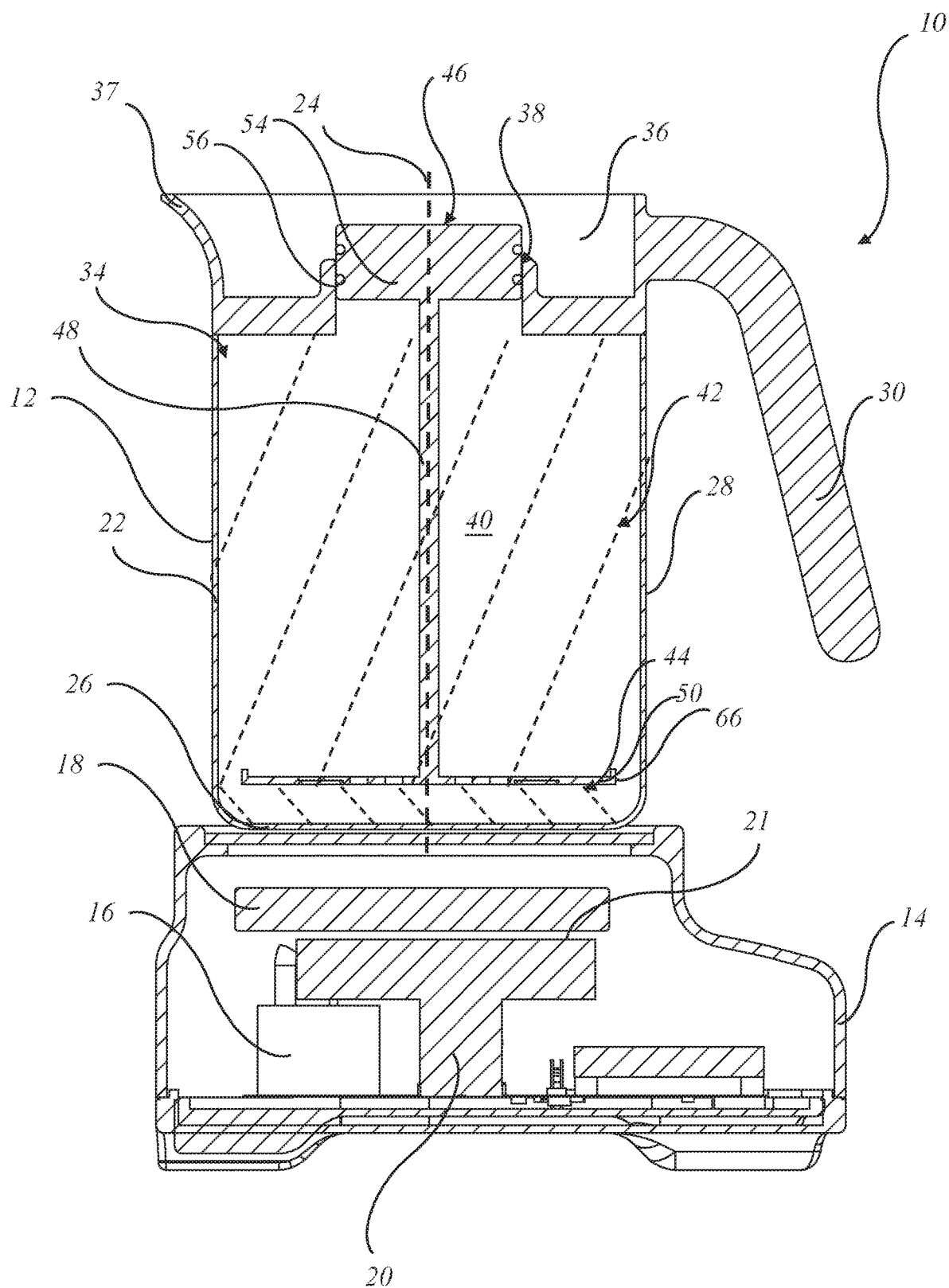
FIG. 3 is a schematic cross-sectional view of the appliance of FIG. 1, shown with the plate of the appliance located in an upper region of the chamber.
Figure 10:
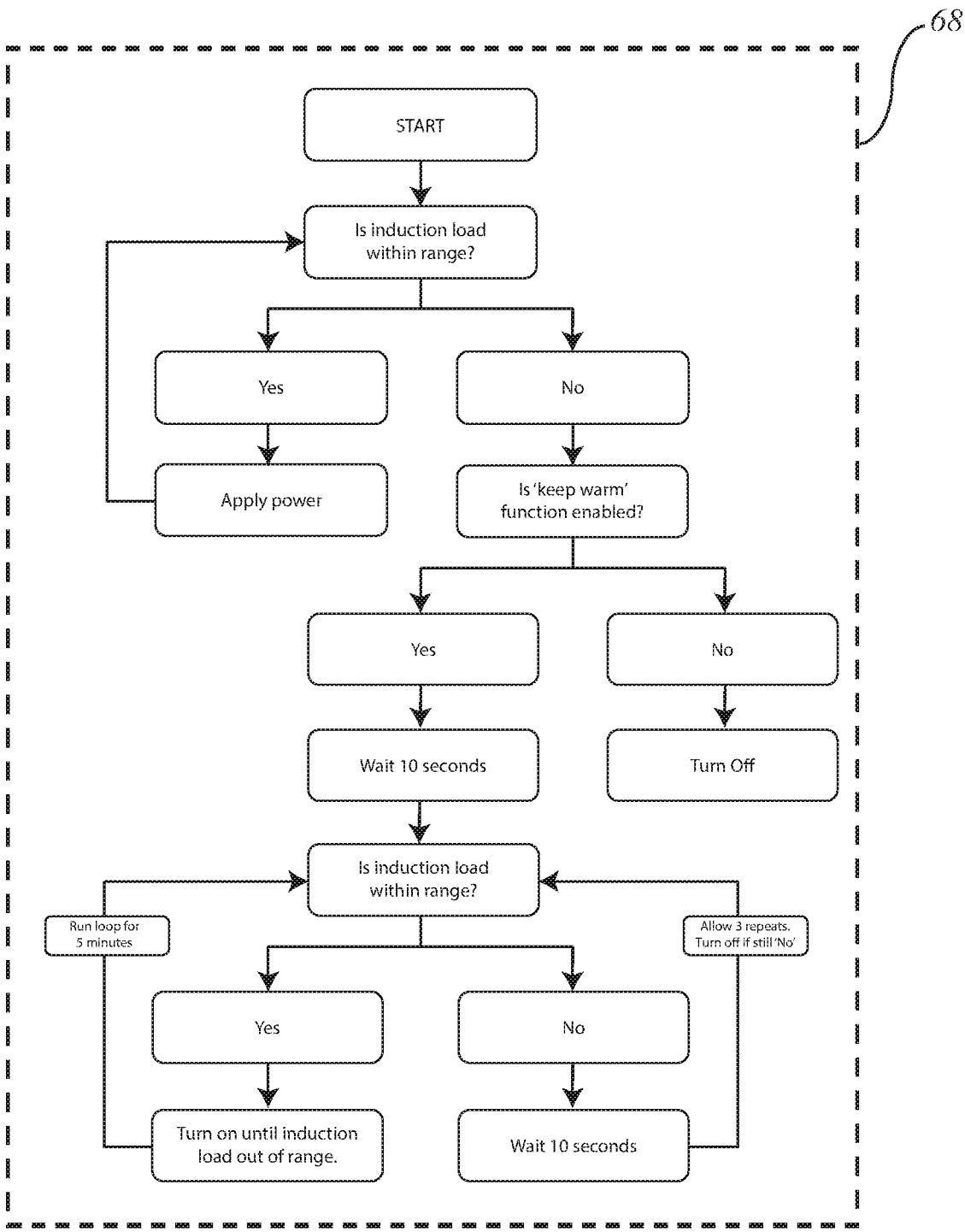
FIG. 10 is a flowchart illustrating an algorithm of the appliance of FIG. 1.

The shaft 48 has a predetermined length so as to locate the plate 50 in the lower region 44 when the plate 50 is an operative position, as shown in FIG. 2. In this operative position, the plate 50 is located within the magnetic field delivered by the induction coil 18 so that a current is induced in the plate 50 to cause heating of the plate 50. As the plate 50 increases in temperature, heat from the plate 50 is delivered to the water via conduction. As the water increases in temperature, the water will reach its boiling point as the water undergoes a phase change into a vapor. This vapor consequently increases the pressure inside the chamber 40 relative to outside the chamber 40 to create positive pressure relative to outside the chamber 40. The positive pressure urges the stopper 54 to move upwardly along the axis 24 relative to the channel 38 as the vapor is urged to escape to lower pressure environment outside the chamber 40. This in turn causes the plate 50 to move upwardly along the axis 24 to an inoperative position (shown in FIG. 3) at which the plate 50 is located in the upper region 42 so as to no longer place an operative load on the induction coil 18 so that an operative current is no longer induced in the plate 50 to heat the plate 50. As illustrated in FIG. 10, the micro-processor is programmed to run an algorithm 68 to terminate power to the induction coil 18 once there is no longer an operative load, i.e., the plate 50, on the induction coil 18. In this way, the micro-processor may be configured to operate in a 'keep warm' cycle in which the micro-processor loops for a predetermined number of cycles before terminating power to the induction coil 18. During each loop, the micro-processor is configured to detect if a load, i.e. the plate 50, is present on the induction coil 18. If a load is detected, then power to the induction coil 18 is maintained, otherwise power is terminated to the induction coil 18 after a predetermined number of loops.

Figure 4:
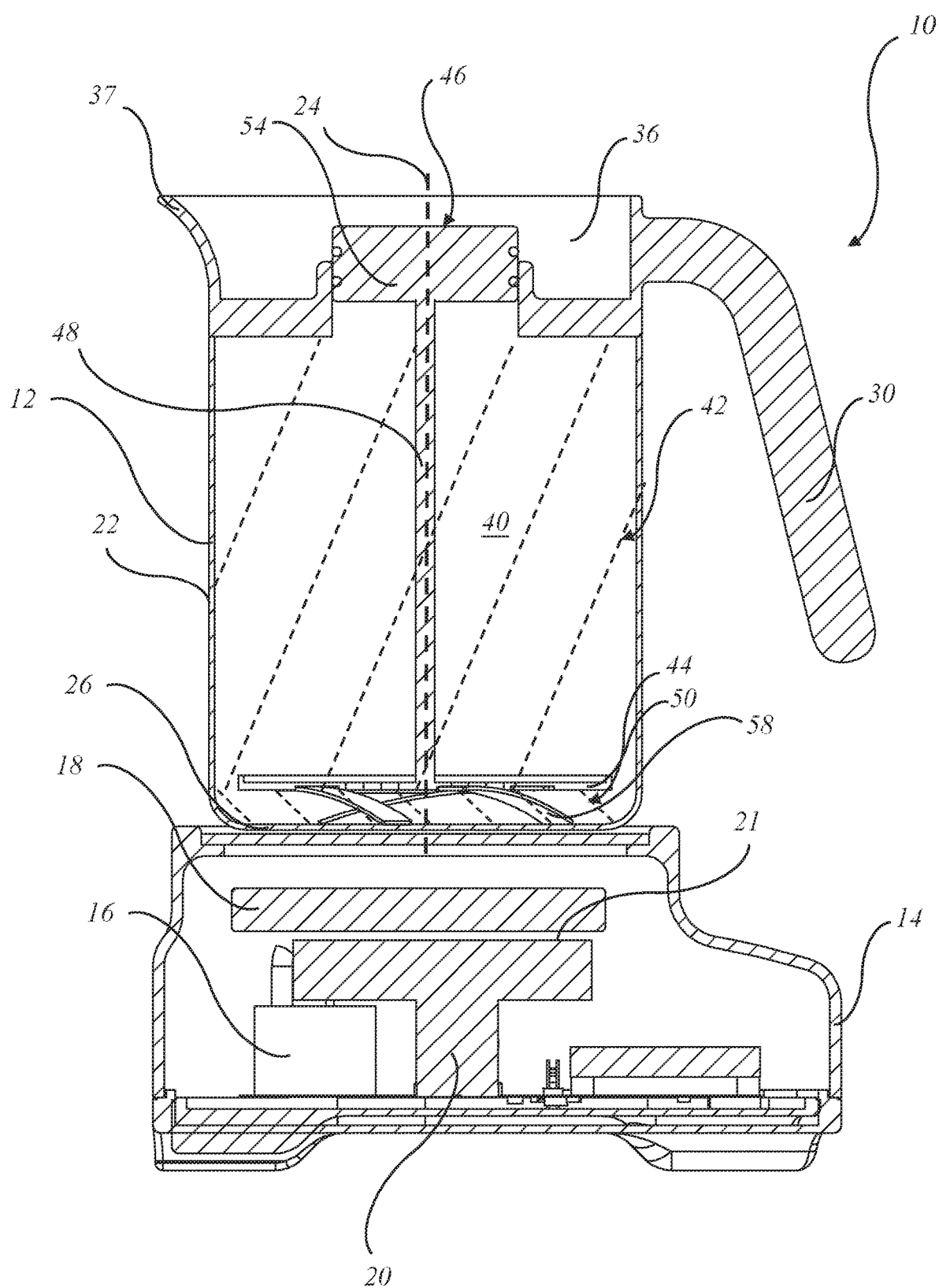
FIG. 4 is a schematic cross-sectional view of the appliance of FIG. 1, shown with the plate having a plurality of bimetallic members in an actuated position.
Figure 5:
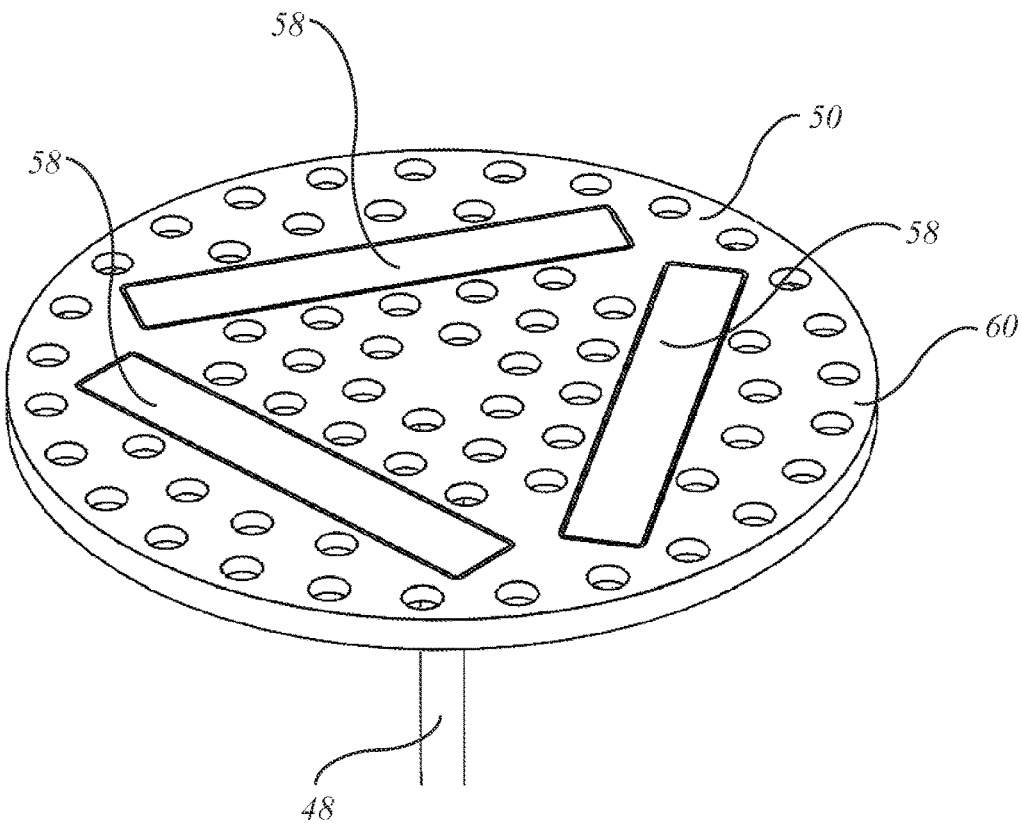
FIG. 5 is a schematic isometric view of an underside of the plate, showing the bimetallic members in a non-actuated position.
Figure 6:
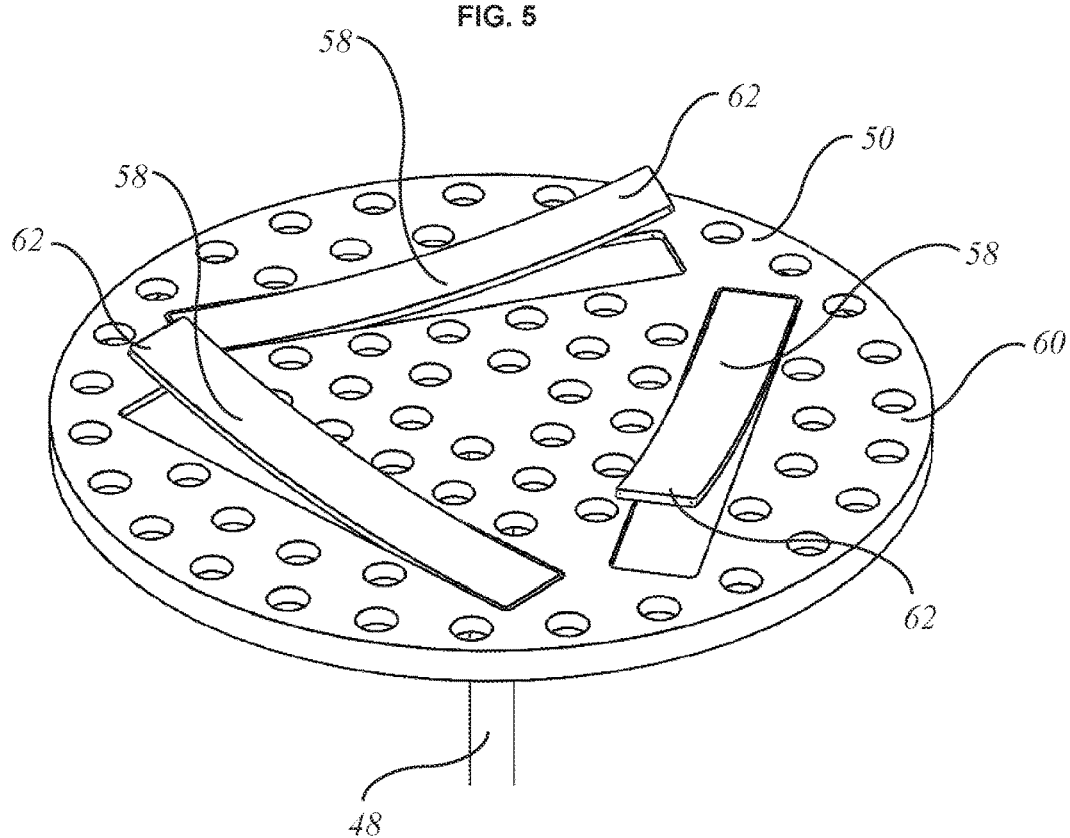
FIG. 6 is a schematic isometric view of the underside of the plate, showing the bimetallic members in an actuated position.
Figure 7:
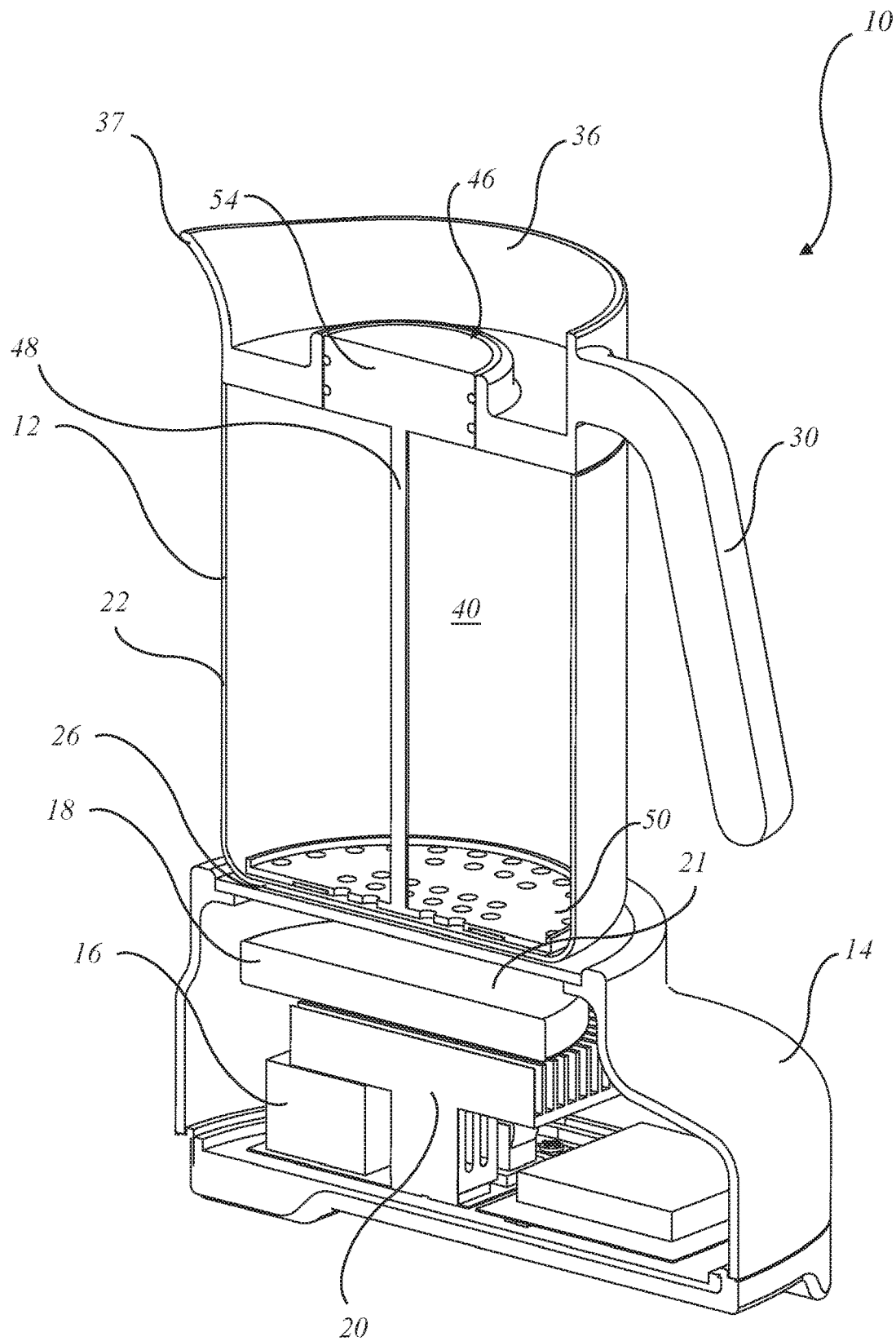
FIG. 7 is a schematic cut away isometric view of the appliance of FIG. 1.

To address a problem of 'dry-boiling', that is, heating the plate 50 without any fluid in the vessel, the plate 50 preferably includes one or more thermally expansive bimetallic members 58 located on an underside 60 of the plate 50. The bimetallic members 58 are formed of a bimetallic material possessing two positions of stability with each of these positions responsive to a predetermined temperature. When the temperature of the member 58 is below a threshold temperature, the member 58 is in one of the stable positions, that is, a position in which the member 58 is generally flat and integral with the underside 60 of the plate 50. As the temperature of the member 58 increases above the threshold temperature, the thermally responsive material of the member 58 actuates or "snaps" to a second position of stability and remains in this position provided the temperature remains at or above the threshold temperature. In the second position, a portion 62 of the member 58 projects away from the underside 60 of the plate 50 and engages the bottom wall 26 to move the plate 50 upwardly, as shown in FIG. 4.

Figure 8:
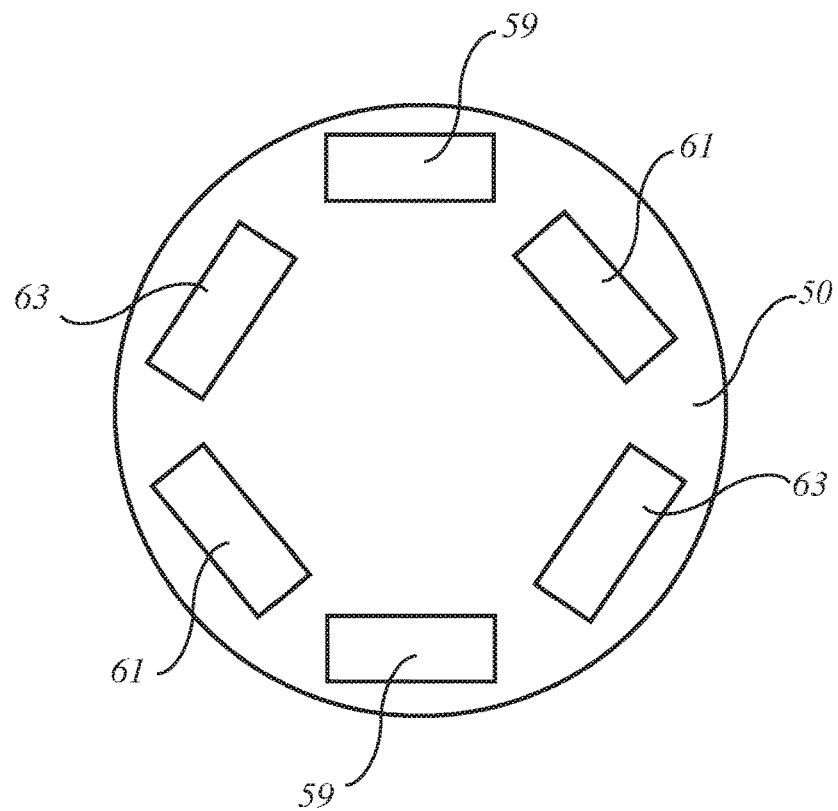
FIG. 8 is a simplified sketch of the underside of the plate, showing a plurality of different bimetallic members in a non-actuated position.
Figure 9:
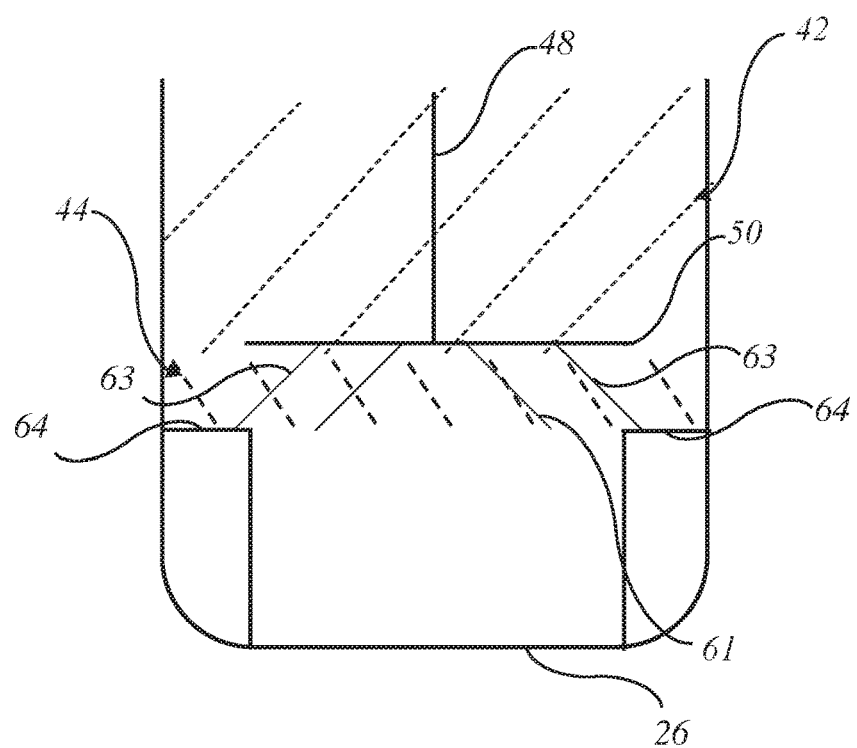
FIG. 9 is a simplified cross-section sketch of the chamber, showing a pair of the bimetallic members engaging an abutment surface of the appliance.

In the embodiment shown in FIGS. 8 and 9, the jug 12 provides one or more abutment surfaces 64 which extend from the bottom wall 26 of the jug 12 into the chamber 40. One of the members 59, 61, 63 are positioned relative to the abutment surfaces 64 so that, as said one of the members 59, 61, 63 is in the second position, the portion 62 of said one of the members 59, 61, 63 can engage and push against the abutment surface 64 to move the plate 50 upwardly along the axis 24. The members 59, 61, 63 have a predetermined length so that, when actuated, the member that engages the abutment surface 64 causes the plate 50 to move upwardly into the upper region 42.

It will be appreciated that the different bimetallic members 59, 61, 63 can be arranged on the underside 60 of the plate 50 each of which may be actuated at different temperatures. In one embodiment, the plate 50 includes the member 59 that is actuated at a temperature of 70° C., the member 61 that is actuated at a temperature of 80° C., and the member 63 that is actuated at a temperature of 100° C. The user may position the plate 50 and therefore the members 59, 61, 63 relative to the abutment surfaces 64 so that only a desired member engages the abutment surface 64 to move the plate 50 upwardly when actuated and so that the other members engage the water which provides no effective resistance to those members. This will indicate the temperature of the water.

The bimetallic members 58, 59, 61, 63 may also assist with minimizing "dry boil", that is, if no water is contained in the chamber 40 and the plate 50 is heated above its rated operating temperature, then at least one of the members will actuate causing the plate 50 to move upwardly into the upper region 42 and out of the influence of the magnetic field.

The plate 50 is preferably perforated to facilitate movement of the plate 50 when submerged in the water. By perforating the plate 50, vapor bubbles which form on the plate 50 as the plate 50 is heated may also spread relatively evenly over the plate 50. By virtue of the shape of the plate 50, heat may be spread evenly which may minimize cavitation and noise associated therewith, resulting in a relatively silent kettle 10 during operation.

The plate 50 also preferably includes a stabilizer in the form of a flange 66 projecting transversely to the plate 50 and extending around a circumference of the plate 50 that at least minimizes the plate 50 from bending or warping, in the event that, for example, the plate 50 expands or contracts due to different temperature gradients.

| Item List | |
|---|---|
| 10 | kettle |
| 12 | jug |
| 14 | heater base |
| 16 | power supply |
| 18 | induction coil |
| 20 | heat sink |
| 21 | surface |
| 22 | hollow body |
| 24 | axis |
| 26 | bottom wall |
| 28 | side wall |
| 30 | handle |
| 32 | rim |
| 34 | upper opening |
| 36 | lid |
| 37 | pouring lip |
| 38 | channel |
| 40 | chamber |
| 42 | upper region |
| 44 | lower region |
| 46 | heater assembly |
| 48 | shaft |
| 50 | plate |
| 51 | one end |
| 52 | other end |
| 54 | stopper |

-continued

Item List

| | |
|---|---|
| 56 | O-ring |
| 58, 59, 61, 63 | bimetallic members |
| 60 | underside |
| 62 | portion |
| 64 | abutment surface |
| 66 | flange |
| 68 | algorithm |

The invention claimed is:

1. An appliance to heat a liquid, the appliance including:
a vessel to receive the liquid to be heated, the vessel having a generally central upright longitudinal axis, a bottom wall, and a side wall extending upwardly from the bottom wall, with the bottom wall and side wall at least partly enclosing a chamber within which the liquid is heated, with the chamber having an upper region axially spaced from the bottom wall, and a lower region located between the bottom wall and the upper region;
a heating element located within the chamber for relative movement therewithin, with the heating element at least partly formed of ferromagnetic material;
a heater base to be positioned relative to the bottom wall of the vessel, the heater base including at least a portion of an induction coil; and
connections to deliver an alternating current to the induction coil so as to deliver a magnetic field to the lower region, wherein
the heating element is movable relative to the coil between an operative position at which the heating element is located within the lower region so as to be energised by the magnetic field to cause heating of the heating element so that heat generated by the heating element can be delivered to the liquid via conduction, and an inoperative position at which the heating element is located in the upper region so as to no longer place an operative load on the induction coil,
wherein the heating element is in the form of a plate centrally located on the axis, and
wherein the plate includes at least one bimetallic member located on an underside of the plate, with the member possessing at least two positions of stability, with each of the positions responsive to a threshold temperature.

2. The appliance of claim 1, further including a cover attached to the vessel so as to enclose, with the bottom wall and the side wall, the chamber, with the cover including:
an opening extending through the cover and generally centrally located on the axis; and
a stopper at least partly sealingly located within the opening for movement relative thereto along the axis between a retracted position and an extended position at which the stopper is spaced upwardly along the axis from the retracted position, wherein
the heating element is connected to the stopper so as to move therewith, with the retracted position corresponding to the operative position, and with the extended position corresponding to the inoperative position, and wherein
the stopper is urged to move from the retracted position to the extended position when the chamber is subjected to a positive pressure relative to outside the chamber so as to move the heating element from the operative position to the inoperative position.

3. The appliance of claim 2, further including a shaft generally aligned with the axis, with one end of the shaft attached to the heating element, and with the other end of the shaft attached to the stopper.

4. The appliance of claim 3, wherein the shaft has a predetermined length so as to locate the heating element in the lower region when the heating element is in the operative position and so as to locate the heating element in the upper region when the heating element is in the inoperative position.

5. The appliance of claim 1, wherein, when the member is at a temperature below the threshold temperature, the member is in one of the stable positions in which the member is generally coplanar with the underside of the plate, and wherein, when the member is at a temperature above the threshold temperature, the member is configured to actuate to the second position of stability in which at least a portion of the member engages the bottom wall to move the plate into the upper region.

6. The appliance of claim 1, wherein the plate is perforated.

7. A vessel to receive liquid to be heated by a heater base, the heater base having an induction coil and connections to deliver an alternating current to the induction coil so as to deliver a magnetic field to the vessel, the vessel having a generally central upright longitudinal axis, a bottom wall, and a side wall extending upwardly from the bottom wall, with the bottom wall and side wall at least partly enclosing a chamber within which the liquid is heated, with the chamber having an upper region axially spaced from the bottom wall, and a lower region located between the bottom wall and the upper region; and
a heating element located within the chamber for relative movement therewithin, with the heating element at least partly formed of ferromagnetic material,
wherein the heating element is movable relative to the bottom wall between an operative position, at which the heating element is located within the lower region so as to be energised by the magnetic field to cause heating of the heating element so that heat generated by the heating element can be delivered to the liquid via conduction, and an inoperative position, at which the heating element is located in the upper region, so as to no longer place an operative load on the induction coil,
wherein the heating element is in the form of a plate centrally located on the axis, and
wherein the plate includes at least one bimetallic member located on an underside of the plate, with the member possessing at least two positions of stability, with each of the positions responsive to a threshold temperature.

8. The vessel of claim 7, further including a cover so as to enclose, with the bottom wall and the side wall, the chamber, with the cover including:
an opening extending through the cover and generally centrally located on the axis; and
a stopper at least partly sealingly located within the opening for movement relative thereto along the axis between a retracted position and an extended position at which the stopper is spaced upwardly along the axis from the retracted position, wherein
the heating element is connected to the stopper so as to move therewith, with the retracted position corresponding to the operative position, and with the extended position corresponding to the inoperative position, and wherein
the stopper is urged to move from the retracted position to the extended position when the chamber is subjected to a positive pressure relative to outside the chamber so as to move the heating element from the operative position to the inoperative position.

9. The vessel of claim 8, further including a shaft generally aligned with the axis, with one end of the shaft attached to the heating element, and with the other end of the shaft attached to the stopper.

10. The vessel of claim 9, wherein the shaft has a predetermined length so as to locate the heating element in the lower region when the heating element is in the operative position and so as to locate the heating element in the upper region when the heating element is in the inoperative position.

11. The vessel of claim 7, wherein, when the member is at a temperature below the threshold temperature, the member is in one of the stable positions in which the member is generally coplanar with the underside of the plate, and wherein, when the member is at a temperature above the threshold temperature, the member is configured to actuate to the second position of stability in which at least a portion of the member engages the bottom wall to move the plate into the upper region.

12. The vessel of claim 7, wherein the plate is perforated.

\* \* \* \* \*